United States Patent [19]

Lindén

[11] Patent Number: 5,291,996
[45] Date of Patent: Mar. 8, 1994

[54] REUSABLE DISPLAY SHEATH WITH FRANGIBLE LATCH MEANS

[75] Inventor: Erkki O. Lindén, Billnäs, Finland
[73] Assignee: Fiskars Oy Ab, Helsinki, Finland
[21] Appl. No.: 3,967
[22] Filed: Jan. 15, 1993
[51] Int. Cl.⁵ .................................... B65D 73/00
[52] U.S. Cl. .................... 206/349; 206/461; 206/477
[58] Field of Search ............. 206/349, 461–463, 206/467–471, 477–483, 807

[56] References Cited

U.S. PATENT DOCUMENTS

| | | |
|---|---|---|
| 1,479,614 | 1/1924 | Korhummel . |
| 2,684,758 | 7/1954 | Aquino . |
| 4,165,805 | 8/1979 | Fethke et al. . |
| 4,179,029 | 12/1979 | Fethke et al. . |
| 4,610,354 | 9/1986 | Hostetler ............. 206/349 |
| 4,650,074 | 3/1987 | Vosbikian ............ 206/349 |
| 4,714,159 | 12/1987 | Lindén . |
| 4,872,551 | 10/1989 | Theros . |

FOREIGN PATENT DOCUMENTS

| | | | |
|---|---|---|---|
| 1184889 | 4/1985 | Canada ................. | 206/349 |
| 2509491 | 9/1976 | Fed. Rep. of Germany ...... | 206/349 |
| 1242088 | 8/1971 | United Kingdom ............. | 206/461 |

*Primary Examiner*—Jimmy G. Foster
*Attorney, Agent, or Firm*—Foley & Lardner

[57] ABSTRACT

The present invention relates to a reusable display sheath for protecting the working end of an article such as a pair of scissors, the sheath comprises an elongated passage having a longitudinal axis, a first end, and an opposed open end for accommodating insertion and withdrawal of the working end of the article, and frangible latch means that are integrally formed in the sheath at its open end, the latch means comprising a frangible tongue separable from the sheath to effect unlocking of the article from the sheath while permitting its semi-permanent engagement with the sheath.

15 Claims, 2 Drawing Sheets

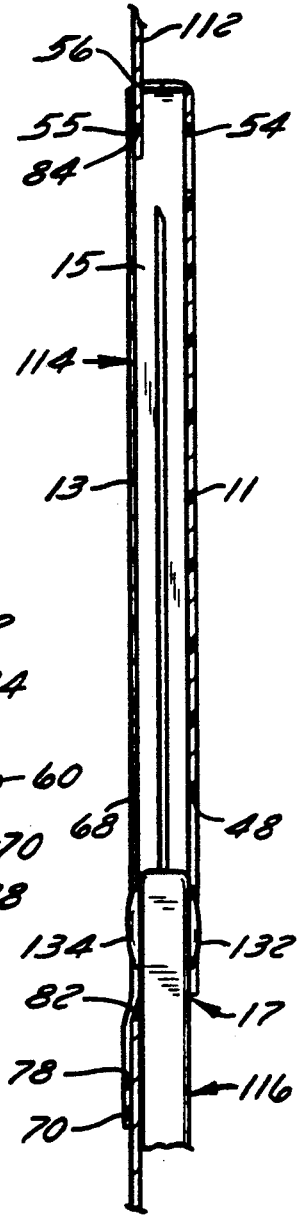
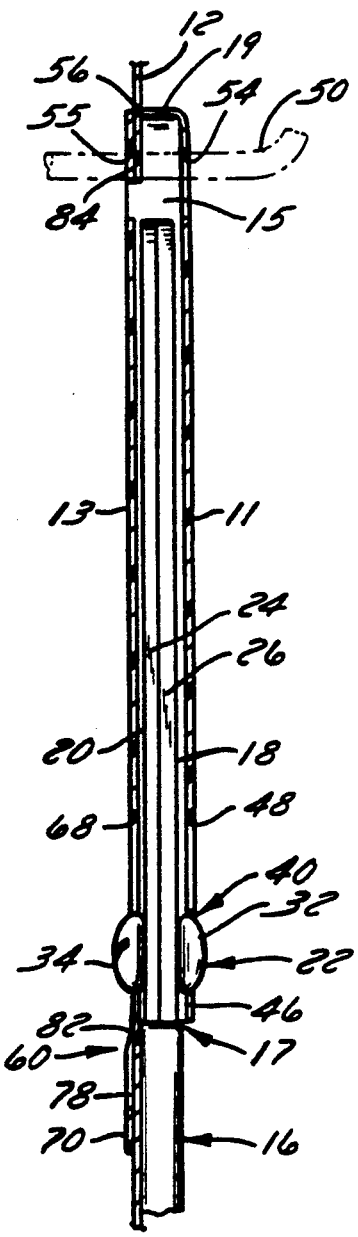
FIG. 4
FIG. 5
FIG. 6

REUSABLE DISPLAY SHEATH WITH FRANGIBLE LATCH MEANS

TECHNICAL FIELD

The present invention relates, generally, to display packages for articles such as scissors, pliers, items of cutlery, and the like. More particularly, this invention is concerned with a display package comprising a sheath intended to protect the working end of a tool disposed therein, the tool having an opposed force applying end disposed across a protruding stud. The sheath, which is advantageously made of rigid material, is provided with breakable tabs for semi-permanently engaging the protruding stud thereby preventing the tool from being removed from the display package. The sheath is, however, reusable by the purchaser once the tabs are broken off the sheath. Although it will become apparent from the following description that certain features of this invention may be utilized in a display package used in connection with tools of various construction, for ease of understanding and convenience, the following description will from time to time specifically refer to a sheath used to protect the blades of a pair of scissors as the most preferred implementation of the present invention.

BACKGROUND OF THE INVENTION

Pivoted implements, such as scissors, are customarily sold in display packages. Preferably, such packages include a transparent cover and a display card bearing the name of the manufacturer in addition to other pertinent user information. Various means such as ties, loops, staples etc., have been used for securing the tool to the cover and/or card.

For some time now, to improve shelf appeal and reduce packaging labor, blister packages have been used and have become quite customary to display some of these implements. In such prior art blister packages, the article itself is secured to the card as it is completely encapsulated between a clear plastic cover and the card in such a manner that the article can be viewed but cannot be touched. It has been found, however, that consumers interested in an item often want to manipulate the item or test operate it within the confines of the display unit.

The deficiencies of commonly known display packages have been recognized and addressed in various ways by those skilled in the art. For example, in U.S. Pat. No. 4,165,805 to Fethke et al., the blister pack has been provided with a cutout allowing restricted movement of the blades of the displayed scissors. U.S. Pat. No. 4,872,551 to Theros discloses a working clamshell blister package wherein the handles of a pair of pliers are completely accessible to the user while the plier jaws are enclosed. Finally, in U.S. Pat. No. 4,714,159 to the present inventor, the detent area of a clear plastic sheath mounted on a card engages the pivot member of a pair of scissors, thereby allowing quick assembly of the entire display package and removably securing the scissors to the reusable sheath.

It can be readily appreciated, however, that while display packages in accordance with Fethke and Theros prevent removal of the item from the display card, such display packages cannot conveniently be reused by consumers as sheathes to protect the working surfaces of such items. On the other hand, in a display package such as that disclosed in U.S. Pat. No. 4,714,159 to the present inventor, the reusable sheath permits the interested purchaser to completely remove the displayed item from the sheath, thereby allowing pilferage.

Thus, it is desirable to provide an inexpensive display package for items such as scissors or the like which can alleviate the problems associated with conventional merchandising methods, i.e., which permits viewing, manipulation, and at least restricted testing, of the item prior to purchase while preventing complete removal of the item from the display package, and which also provides a reusable sheath designed to protect the blades of the scissors when not in use.

SUMMARY OF THE INVENTION

The present invention provides an improved display package, for items such as scissors, which is inexpensive to produce and assemble, which reduces pilferage, and which can be reused later as a sheath to protect the blades of the item.

According to one embodiment of the present invention, a display package comprises a sheath having a securing member to prevent removal of the item from the display package while permitting manipulation and limited testing of the item by the interested consumer prior to purchase. This embodiment is designed to allow the consumer to reuse the sheath after purchase to protect the working surfaces of the item when not in use.

According to a preferred embodiment of the present invention, the display package is characterized in that the sheath is provided with a latch engaging by snap action the protruding pivot member of a pair of scissors. This embodiment has a latch with frangible tabs which must be broken off the sheath to permit removal of the scissors from the sheath while allowing the user to reuse the sheath to protect the blades of the scissors.

Other advantages of the present invention will become apparent from the detailed description given hereinafter. It should be understood, however, that the detailed description and specific embodiments are given by way of illustration only since, from this detailed description, various changes and modifications within the spirit and scope of the invention will also become apparent to those skilled in the art.

BRIEF DESCRIPTION OF THE DRAWINGS

The present exemplary embodiment of the present invention will hereinafter be described in conjunction with the appended drawings, wherein like numerals denote like elements and:

FIG. 4 is a perspective view of the rear of the sheath shown in FIG. 2;

FIG. 5 is a side elevational view of a display package according to the present invention used to display a knife; and FIG. 6 is a side elevational view of the package illustrated in FIG. 1.

DETAILED DESCRIPTION OF A PREFERRED EXEMPLARY EMBODIMENT

The present invention relates to display packages for items comprising at least one elongated member having a working end and an opposed force applying end. Accordingly, the term "scissors" as used herein from time to time should also be understood to connote other types of items such as pliers, shears, and other cutlery items, etc. which may be displayed in a sheath of the type disclosed in the present invention and which have a protuberance cooperating with the latch member of the sheath to prevent pilferage of the item. In this vein, those skilled in the art will further appreciate that the device described herein and its principle of operation are broadly applicable to a wide variety of implements generally, and may be adapted to items other than scissors. Accordingly, while the present invention is hereinafter described in connection with a pair of scissors, the skilled artisan will note its many other applications.

Figure 1:
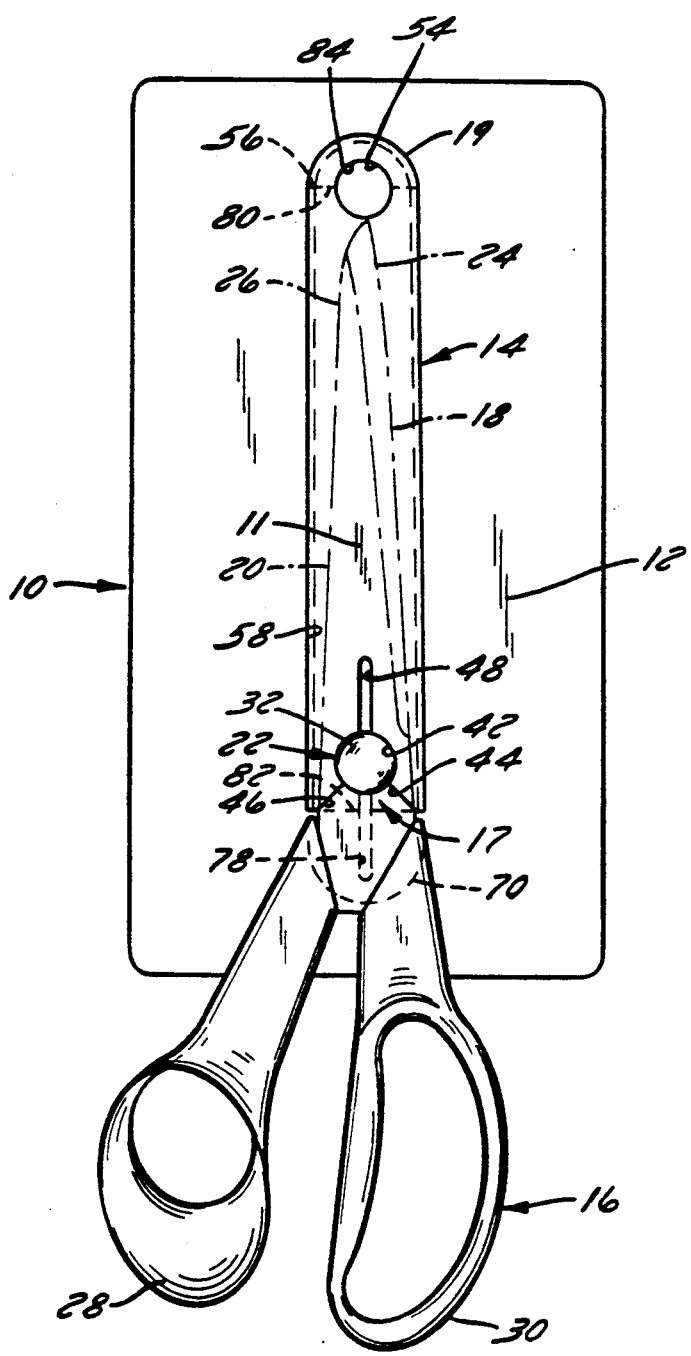
FIG. 1 is a top plan view of a display package according to the present invention used to display a pair of scissors.

Referring to the Figures, a display package in accordance with the present invention, designated generally as 10, is shown to comprise a display card 12 made for example of cardboard, and a sheath 14 preferably made of rigid clear plastic. Sheath 14 has opposing spaced-apart front and rear walls 11, 13, respectively, which define an elongated passage 15 having an opening generally designated as 17 and an opposed closed end 19. Sheath 14 is shown mounted on card 12 enclosing a pair of scissors identified as 16. Scissors 16 comprise elongated members 18 and 20 disposed for cooperative engagement about a protruding pivotable joint generally designated as 22, having studs 32 and 34. Studs 32, 34 can be conventionally formed by a rivet or a screw head but are preferably made of plastic material. Elongated members 18 and 20 respectively comprise scissor blades 24, 26, and handles 28, 30. Scissors 16 are shown in FIG. 1 with blades 24, 26 positioned within sheath 14, while handles 28, 30 are shown outside sheath 14.

Sheath 14 is formed of a substantially rigid material, preferably clear PVC plastic, having a wall thickness of about 1 mm. Scissors 16 are secured to sheath 14 by a latch mechanism generally designated as 40, which engages stud 32.

Latch 40 is formed in front wall 11 and comprises a resiliently flexible receiving member 42. The receiving member 42 is advantageously shaped as a circle, opening on a neck 44 which extends along edges 46 from receiving member 42 to opening 17. A slit 48, running parallel with the longitudinal axis of sheath 14, extends from receiving member 42 towards closed end 19. Slit 48 permits flexing of portions of receiving member 42 when stud 32 engages therewith. In its free state, receiving member 42 has a diameter which is slightly smaller than the diameter of stud 32, thereby allowing stud 32 to latch with receiving member 42.

Referring more particularly to FIGS. 4 and 6, frangible latch means, generally designated as 60, engages stud 34. Latch means 60, which is integrally formed in rear wall 13, comprises a resiliently flexible enclosing member 62 advantageously shaped as a circle, and a frangible tongue 70 extending from enclosing member 62 toward and beyond sheath opening 17. A slit 68, running parallel with the longitudinal axis of sheath 14, extends from enclosing member 62 towards closed end 19. Slit 68 permits flexing of portions of enclosing member 62 to facilitate engagement of stud 34 therewith. In its free state, enclosing member 62 has a diameter which is slightly smaller than the diameter of stud 34.

Frangible tongue 70, which is conveniently shaped as a portion of a disk, comprises ribs 72 and 74 extending radially from enclosing member 62 toward open end 17. Frangible tongue 70 further includes a slit 78 parallel to the longitudinal axis of sheath 14 and extending from enclosing member 62 substantially into frangible tongue 70. In addition, to facilitate assembly of display unit 10, frangible tongue 70 is advantageously stepped away from the plane of rear wall 13 to reduce stresses caused in rear wall 13 by stud 34 during insertion of blades 24, 26 into sheath 14.

To secure scissors 16 to sheath 14, blades 24, 26 are inserted into sheath 14 through opening end 17 so that studs 32, 34 respectively engage latch means 40, 60. When studs 32, 34 reach receiving member 42 and enclosing member 62, respectively, slit 48 allows stud 32 to enlarge receiving member 42 to correspond to the diameter of stud 32, while slits 68 and 78 facilitate engagement of stud 34 with enclosing member 62.

By virtue of the forces exerted by pivotable joint 22 on receiving member 42 and enclosing member 62, and because enclosing member 62 substantially encloses the diameter of stud 34, scissors 16 become latched in sheath 14 at stud 32, in addition to being latched and locked within sheath 14 at stud 34, thereby reducing pilferage. When the user subsequently wishes to remove scissors 16 from sheath 14, it will be necessary for the user to separate frangible tongue 70 from sheath 14 along ribs 72 and 74; scissors 16 are therefore semi-permanently secured to sheath 14. With frangible tongue 70 broken off sheath 14, latch means 40 and 60 are symmetrical; scissors 16 become removably secured (i.e., only latched in means 40, 60 at studs 32, 34, respectively) to sheath 14 and blades 24, 26 may be freely withdrawn from and inserted into reusable sheath 14.

To facilitate merchandising scissors 16 in protective sheath 14, e.g., to display sheath 14 on a peg or other display hook of a merchandising panel, sheath 14 is provided with ways to hang sheath 14 on a merchandising display. This hanging feature preferably consists of a pair of registering apertures 54, 55 located at closed end 19. Furthermore, as most displayed items are commonly sold with accompanying marketing and other user information, such items are generally displayed on a card on which such information is printed. Accordingly, to secure sheath 14 to display card 12, display card 12 is provided with an elongated opening 58 which has at least the same width as sheath 14. A slot 56 is provided in sheath 14 at closed end 19 and proximate rear wall 13. Slot 56 has a width substantially corresponding to the thickness of card 12 so that sheath 14 can be inserted at the upper edge 80 of elongated opening 58, while frangible tongue 70 extends beyond the lower edge 82 of elongated opening 58.

Figure 2:
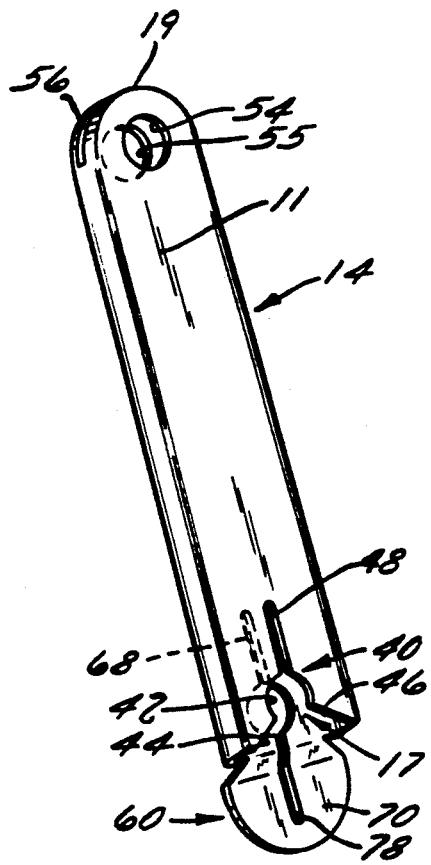
FIG. 2 is a perspective view of the sheath of the display package shown in FIG. 1.
Figure 3:
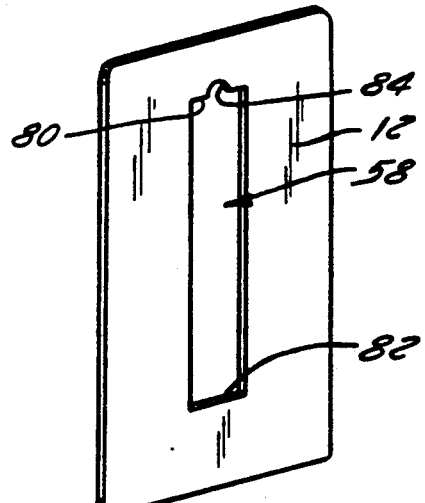
FIG. 3 is a perspective view of the card of the display package shown in FIG. 1.

Although to be able to load package 10 on the peg 50 of a merchandising panel it is sufficient to provide a cutout at the top of display card 12, to interlock display card 12 with sheath 14 and scissors 16, i.e., to further secure sheath 14 to display card 12, such cutout is preferably aligned with registering apertures 54 and 55. More particularly and referring to FIGS. 2, 3, and 6, a cutout 84 is provided near top edge 80 so that when sheath 14 is received within elongated opening 58, registering apertures 54, 55, and cutout 84 are in registration. Thus, peg 50 (or a rod or hook) of a merchandising panel extending through apertures 54, 55, and cutout 84, interlocks display card 12 with sheath 14 in which scissors 16 are semi-permanently received, thereby further impeding removal of scissors 16 from display card 12.

Display package 10 is readily assembled. Sheath 14 is inserted into elongated opening 58 from the back of display card 12 so that slot 56 engages upper edge 80. Sheath 14 is then pushed through opening 58 to the front surface of card 12 until tongue 70 makes contact with the back surface of card 12. Thereafter, blades 24, 26 are inserted into sheath 14 until pivotable joint 22 reaches latch means 40, 60, thereby semi-permanently securing scissors 16 to sheath 14 in the position shown in FIG. 1. When display package 10 is subsequently loaded on peg 50 of a merchandising panel, display card 12, sheath 14, and scissors 16 are interlocked.

It is understood that the above description is of a preferred exemplary embodiment of the present invention, and that the invention is not limited to the specific forms described. For example, certain scissors may not require both studs 32 and 34 to engage latch means 40 and 60, respectively, as such scissors may be sufficiently secured to sheath 14 only by stud 34 engaging latch means 60. In that case, latch means 40 is no longer required. Moreover, although the invention is illustrated in FIGS. 1-4 and 6 in connection with a pair of scissors, it is conceivable that the invention may also be used to semi-permanently secure to the sheath a non-pivoted implement such as a knife or other item of cutlery, as shown in FIG. 5, wherein a knife 116 having studs 132, 134, is semi-permanently secured at studs 132, 134 to a sheath 114 according to the present invention mounted on a display card 112. It should also be noted that scissors 16 in sheath 14 may be displayed in ways other than those disclosed herein. However, such other configurations and applications are considered to be within the scope of this invention. Accordingly, these and other substitutions, modifications, changes and omissions may be made in the design and arrangement of the elements disclosed herein without departing from the scope of the appended claims.

I claim:

1. A reusable display sheath for protecting the working end of a tool having an opposed force applying end disposed across a protruding stud projecting from said tool, said sheath comprising:
    an elongated passage having a longitudinal axis, a first end, and an opposed open end for accommodating insertion and withdrawal of said working end along said axis; and
    frangible latch means, integrally formed in said sheath at said open end, comprising a frangible tongue separable from said sheath to effect unlocking of said tool from said sheath while permitting semi-permanent engagement of said tool with said sheath by said protruding stud.

2. The sheath of claim 1 further comprising hanger means disposed proximate said first end for displaying said tool.

3. A reusable display sheath for protecting the working portions of a pivoted tool having opposed force applying ends disposed across a protruding pivotable joint projecting from said tool, said sheath comprising:
    an elongated passage having a longitudinal axis, a first end, and an opposed end for accommodating insertion and withdrawal of said working portions along said axis when said tool is in substantially closed configuration; and
    frangible latch means, integrally formed in said sheath at said open end, comprising a frangible tongue separable from said sheath to effect unlocking of said tool from said sheath while permitting semi-permanent engagement of said tool with said sheath by said protruding joint.

4. The sheath of claim 3, wherein said frangible latch means further comprises an enclosing member substantially centered on said longitudinal axis for cooperative engagement with said protruding joint, and wherein said tongue extends from said enclosing member beyond said open end and comprises a plurality of ribs projecting outwardly from said longitudinal axis to facilitate separation of said tongue from said sheath along said ribs, whereby said enclosing member removably engages said joint when said tongue is broken off said sheath.

5. The sheath of claim 4, wherein said tongue is stepped away from the plane of said frangible latch means to facilitate engagement of said protruding joint with said frangible latch means as said working portions are inserted into said elongated passage.

6. The sheath of claim 4, wherein said frangible latch means further comprises a slit sufficiently extending from said enclosing member, along said longitudinal axis, away from said open end, and substantially into said tongue, to permit flexing of portions of said frangible latch means adjacent said enclosing member to facilitate engagement of said joint with said frangible latch means.

7. The sheath of claim 4 further comprising a non-frangible latch means cooperating with said frangible latch means to removably secure said tool to said sheath when said tongue is broken off said sheath.

8. The sheath of claim 7 wherein said frangible latch means and said non-frangible latch mans are generally symmetrical with respect to said longitudinal axis when said tongue is broken off said sheath.

9. The sheath of claim 3 further comprising a non-frangible latch means cooperating with said frangible latch means to secure said tool to said sheath.

10. The sheath of claim 9 wherein said non-frangible latch means comprises a receiving member, substantially centered on said longitudinal axis for cooperative engagement with said protruding joint, and a slit sufficiently extending, along said longitudinal axis, from said receiving member towards said first end to permit flexing of portions of said non-frangible latch means adjacent said receiving member to facilitate engagement of said joint with said non-frangible latch means.

11. The sheath of claim 3 further comprising hanger means disposed proximate said first end for displaying said tool.

12. A display package for protecting the working portions of a pivoted tool having opposed force applying ends disposed across a protruding pivotable joint projecting from said tool, said display package comprising:
    (a) a sheath
        i) having a pair of opposing spaced-apart walls defining an elongated passage having a longitudinal axis, a first end, and an opposed open end for accommodating insertion and withdrawal of said working portions along said axis when said tool is in substantially closed configuration,
        ii) having frangible latch means integrally formed in one of said walls at said open end, for semi-permanently securing said tool to said sheath by said protruding joint, iii) having a pair of registering apertures in said walls proximate said first end; and (b) a card having an elongated opening sufficient to receive said sheath, said opening having a top edge and a bottom edge, said top edge having a cutout portion, said cutout and said registering apertures being in registration when said sheath is received within said elongated opening, to interlock said card with said sheath at said apertures when said display package is mounted on the peg rod of a merchandising panel.

13. A display package for a pivoted tool comprising a pair of elongated members disposed for cooperative engagement about a pivotable joint having at least one protruding stud, said elongated members having working portions and opposed force applying ends disposed across said pivotable joint, said display package comprising:

an elongated sheath wherein said working portions are received, said sheath
 a) being of substantially rigid material,
 b) having a pair of opposing spaced-apart walls,
 c) having side portions connected with said walls along the length of the sheath to define a passage having a first end an opposed open end for lengthwise insertion of said working portions thereinto,
 d) having a pair of registering apertures proximate said first end,
 e) at least one of said walls having at said open end a frangible latch means integrally formed therein, said frangible latch means being engageable with said stud as said working portions are inserted into said passage, to semi-permanently confine said working portions against withdrawal from said sheath; and a display card, for displaying said tool in said sheath, said display card
 a) comprising a panel of cardboard or the like, said panel having front and back surfaces,
 b) having an elongated opening in which said sheath is closely receivable with said other of said walls spaced beyond said front surface and said frangible latch means substantially overlying said back surface,
 c) said elongated opening having a top edge, a bottom edge, and a cutout at said top edge, said cutout and said registering apertures being substantially aligned when said sheath is received within said elongated opening, thereby permitting interlocking of said card with said sheath in which said working portions are received when said display package is installed on a merchandising panel peg rod, said force applying ends overlying said front surface to cooperate with said frangible latch means in confining said sheath against displacement out of said elongated opening.

14. The display package of claim 13, wherein said sheath has a slot at said first end, said slot being substantially parallel to said walls and proximate said one of said walls, said slot cooperating with said top edge to prevent displacement of said sheath out of said elongated opening.

15. A scissors sheath comprising:

a pair of opposing spaced-apart walls defining an elongated passage open at one end for accommodating insertion and withdrawal along the path of travel in said passage of the closed blades of a pair of scissors; and frangible latch means for semi-permanently securing said pair of scissors in said sheath, said latch means being integrally formed in one of said walls at the open end of said passage, said latch means comprising a tongue removable therefrom and a resiliently flexible enclosing member for releasable engagement with a pair of scissors inserted into said sheath, said tongue including radially projecting ribs to effect removal of said tongue from said sheath thereby allowing disengagement of said scissors from said enclosing member.

* * * * *